C. L. VALE.
CRACKER-MACHINE.
No. 187,069.  Patented Feb. 6, 1877.
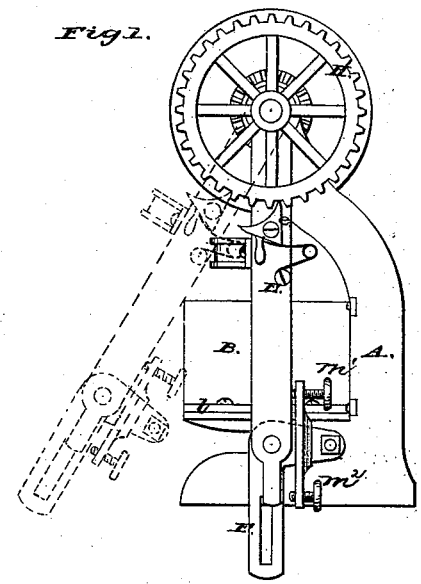
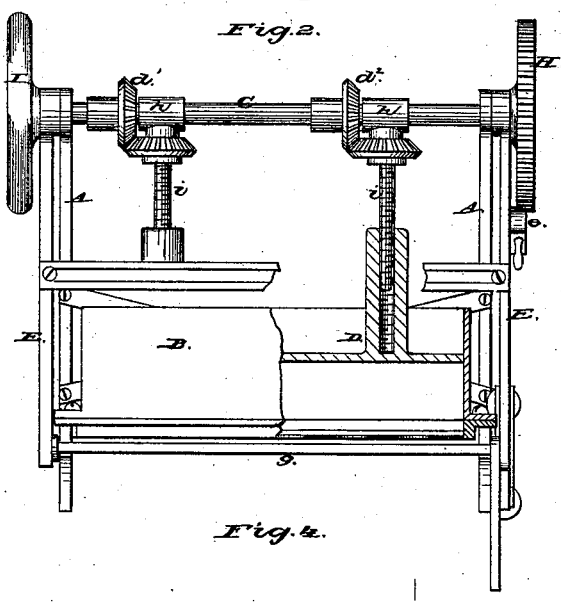
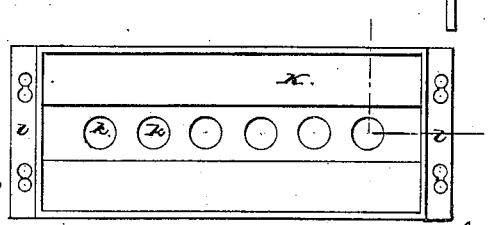
Witnesses:
J. B. Jeffery
A. M. Willard
Inventor.
Chas. L. Vale

UNITED STATES PATENT OFFICE.

CHARLES L. VALE, OF BELOIT, WISCONSIN.

IMPROVEMENT IN CRACKER-MACHINES.

Specification forming part of Letters Patent No. 187,089, dated February 6, 1877; application filed October 24, 1876.

*To all whom it may concern:*

Be it known that I, CHARLES L. VALE, of Beloit, in the State of Wisconsin, have invented Improvements in Cracker-Machines, of which the following is a specification:

The object of my invention is to form crackers or snaps from a mass of dough without rolling the same into sheets, by cutting sections from dough as it is made to escape through proper apertures in a suitable press.

The invention consists in making a cracker-machine having an oscillating or swinging knife; also, in making the frame carrying the swinging knife actuate the gearing of the press; also, in the means whereby the swinging knife-blade is made to raise previous to its forward movement, and lower before it makes its return movement; also, in the manner of making the box or press.

The machine is illustrated in the end view, Figure 1, and in the side view, Fig. 2. Fig. 3 shows an end view of the box or press, and Fig. 4 a top view of the same.

The frame A supports the box or press B at its lower part, and at its upper part carries a shaft, C, having gearing to actuate the follower D of the press. The shaft has also at each end a lever, E E, braced together, and capable of oscillating, forming a swinging frame. This swinging frame carries another swinging frame, F, which is the knife-carrier. The knife $g$ is a slender strip of metal or a wire held sufficiently rigid to cut dough by being strained, and held by bolts connected to its ends. The swinging frame has fastened to one of its sides a dog or pawl, $e$, made to engage with the notches in a wheel, H. The wheel H is fastened to the shaft C, as are also the bevel-wheels $d^1$ and $d^2$, and the hand wheel or crank I. The T-pieces $h\ h$ on the shaft are not fastened, but allow the shaft to turn in them, and have sockets to retain the ends of the follower-screws $i\ i$, and receive the upward thrust of the screws. The box B consists of a rectangular frame, made to fit the follower, having a detachable bottom, K, made in one piece or casting, having holes $k\ k$ for the dough to escape through. The bottom is fastened to the frame by screws passing through slotted holes in the flanges $l\ l$, which serve also as lugs to connect the box to the frame A.

The manner of using the machine may be thus described: A reciprocating movement is, by any suitable machinery, imparted to the swinging knife-carrier F. This is free to move or oscillate slightly on its axis, the amount of oscillation depending on the adjustment of the screws at $m^1\ m^2$.

In the view shown, Fig. 1, the swinging frame has moved to the right its greatest distance, and is ready to return.

It will be noticed the screw $m^1$ is in contact with the frame E, and the knife is at its highest point. The return movement, or to the left, would bring the screw $m^2$ in contact with the frame, and at the same time lower the knife from the position it previously held. Continued movement to the left would bring the swinging frame to the position shown by the dotted lines, which is the extent of its movement. Then moving to the right, it raises the knife. Continued movement brings it under the apertures of the dough-box, and cuts off in sections whatever dough may have been pressed through them. This movement to the right has also, by means of the dog $e$, wheel H, shaft C, and bevel-wheels, imparted to the screws that operate the follower a slight movement downward, thus pressing a portion of the dough through the apertures at each oscillation. In this manner an oscillating or reciprocating movement imparted to the knife-frame raises the knife, presses down the dough, cuts it off, and lowers the knife to clear it on its return motion.

I claim as my invention—

1. In a cracker-machine, a flexible knife, when held rigidly by being stretched between two fastenings, in combination with the oscillating frames F and E, substantially as described.

2. In a cracker-machine, a swing-frame, E E, carrying the cutting-knife.

3. In a cracker-machine, a knife-carrier, F, attached to a swinging frame, substantially as described.

4. In combination with the swing-frame, carrying the cut-off mechanism of a cracker-machine, a dog, *e*, substantially as described.

5. The combination of a dog, notched wheel-shaft, bevel-wheels, and screw with a dough box or press, B.

6. In a cracker-machine, the bottom K, made in one piece of metal, having flanges with holes for bolts, and a sunk or recessed portion, with apertures for the escape of dough, substantially as described, and for the purpose set forth.

CHAS. L. VALE.

Witnesses:
 LYMAN MEACHAM,
 B. C. ROGERS.